Jan. 19, 1954    E. F. RIOPELLE    2,666,341
BIFILAR CENTRIFUGAL PENDULUM VIBRATION DAMPER
Filed Nov. 9, 1950

Inventor:
Earl F. Riopelle

Patented Jan. 19, 1954

2,666,341

UNITED STATES PATENT OFFICE 2,666,341

BIFILAR CENTRIFUGAL PENDULUM VIBRATION DAMPER

Earl F. Riopelle, Detroit, Mich., assignor to Morse Chain Company, Ithaca, N. Y., a corporation of New York Application November 9, 1950, Serial No. 194,853

3 Claims. (Cl. 74—574)

This invention relates in general to centrifugal pendulums, and is more especially, although not exclusively concerned, among these apparatus, with those for use in dynamic vibration dampers.

The expression "dynamic vibration damper" must be understood to include any device in which at least one centrifugal pendulum is brought into action by the occurring of a vibration and tends, through its reaction on the rotating parts upon which it is mounted, to oppose the perturbing displacements which would otherwise be imparted to said rotating parts as a result of this vibration.

Otherwise stated, it is proposed to make centrifugal pendulums in the form of bifilar pendulums, in order to prevent their oscillation from producing a rotation of the pendular mass about its center of gravity, and to have their frequency independent of the magnitude of said mass.

Moreover, the present device seeks to employ conventional parts wherever necessary and possible, thereby to effect a substantial reduction in the cost over the prevailing types of centrifugal pendulum dampers presently being employed.

Accordingly, it is a general object and accomplishment of the invention to provide a centrifugal pendulum of the type above stated which is suspended in a manner better adapted to meet the requirements of practice.

It is another object and accomplishment of the invention to provide means for the suspension of the pendular mass of bifilar centrifugal pendulums consisting of articulating chain links fixed, on the one hand, to the mass, and, on the other hand, to the rotating parts on which the pendulum is mounted, these articulating chain links being adapted to simulate a winding and unwinding during the pendular oscillation on sprocket-like teeth integrally formed on the peripheries respectively of the pendular mass and the rotating parts fixed to a pulley or the like.

A further object and accomplishment of the invention is to provide a highly efficient centrifugal pendulum damper by co-relating and especially designing the various elements thereof to effect advantageous cooperation between said improved elements as will best serve the purpose of providing an efficient system capable of being manufactured at low cost and yet giving the maximum of satisfactory service in use.

An ancillary object and accomplishment of the invention is to provide a new and improved bifilar centrifugal pendulum which is adapted to be economically manufactured and which is so designed as to permit the manufacture and assembly thereof in accordance with present day large scale mass production manufacturing methods of construction and assembly.

The invention seeks, as a further object and accomplishment, to provide a bifilar centrifugal pendulum damper particularly characterized by a design arrangement to more advantageously and satisfactorily perform the functions required of it and adapted to provide a compact unit which will successfully combine the factors of structural simplicity and durability, and yet be economical to manufacture.

Additional objects, features and advantages of the invention disclosed herein will be apparent to persons skilled in the art after the operation and construction thereof are understood from the within description.

It is preferred to accomplish the various objects of this invention and to practice the same in substantially the manner as hereinafter more fully described, and as more particularly pointed out in the appended claims.

Embodiments of the invention are illustrated in the accompanying drawings which form a part hereof and wherein:

Fig. 1 is a diagrammatic illustration of the relative position of the pendulums when a shaft rotates at constant speed;

Fig. 2 diagrammatically illustrates the relative positions when the shaft is rotated ahead of its normal speed;

Fig. 3 diagrammatically illustrates the relative positions when the shaft is rotated behind its normal speed;

The drawings are to be understood to be more or less of a schematic character for the purpose of illustrating or disclosing a typical or preferred form of the improvements contemplated herein and in the drawings like reference characters identify the same parts in the several views.

Figure 1:
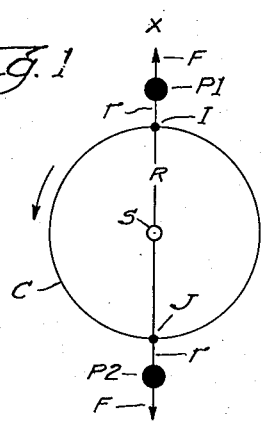
Figure 2:
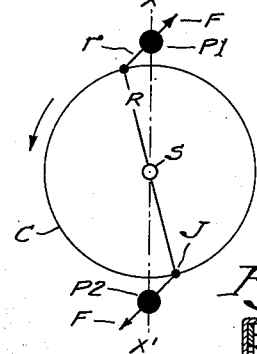
Figure 3:
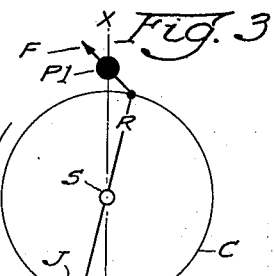
Figure 6:
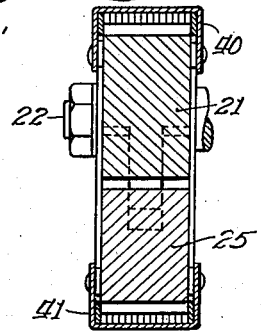
Fig. 6 is a sectional view of the bifilar centrifugal pendulum damper depicted in Fig. 4, and being taken substantially on the plane of the line 6—6 in Fig. 4.
Figure 7:
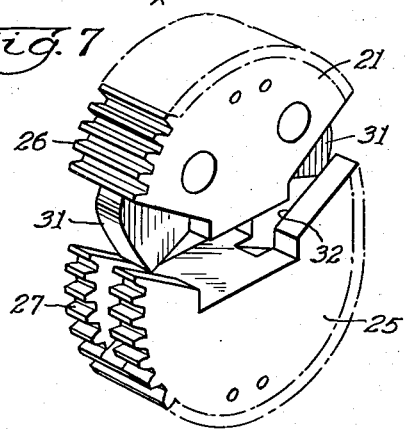
Fig. 7 is a perspective view of some of the elements of the bifilar centrifugal pendulum damper depicted in Fig. 4, these elements being shown before assembly.

In order to provide a working knowledge of the basic and general principles of operation of bifilar centrifugal pendulum vibration dampers, reference is made to the drawings, particularly Figs. 1, 2 and 3 wherein there is shown diagrammatically respectively various positions assumed by bifilar centrifugal pendulum dampers in various vibration frequencies.

Figure 4:
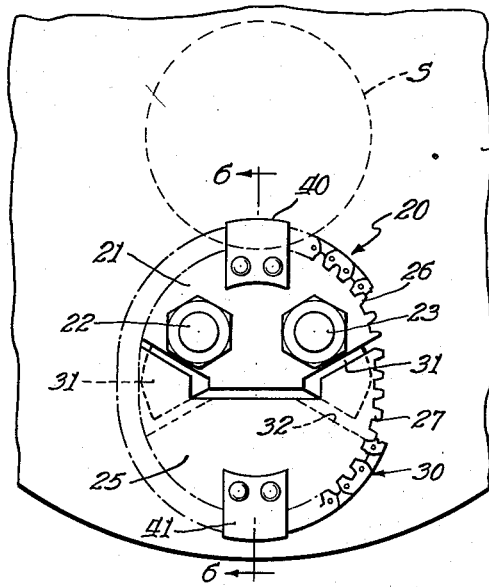
Fig. 4 is a side elevational view of a bifilar centrifugal pendulum damper embodying the features of the present invention.
Figure 5:
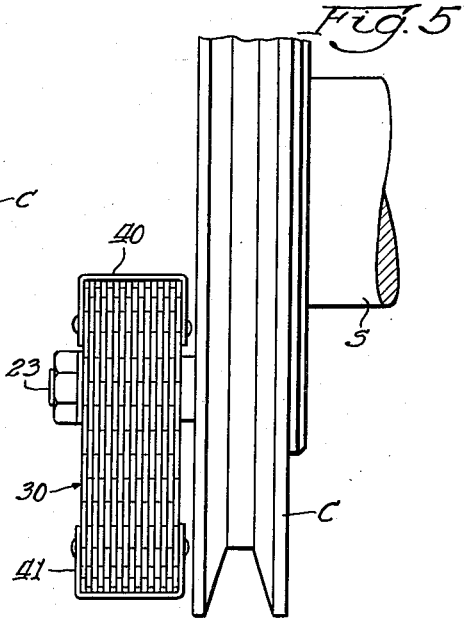
Fig. 5 is a side elevational view of the bifilar centrifugal pendulum damper depicted in Fig. 4.

For purposes of illustration, let us consider a shaft S with a rotatable member C which may be, in some applications, a pulley as shown in Figs. 4 and 5. On two points I and J of the pulley at distance R from the axis of rotation of the shaft there may be provided two free pendulums P-1 and P-2. It can be seen that I and J are the articulation points while $r$ represents the pendulum length. Accordingly, the pendulums will occupy the relative positions as shown in Fig. 1 when the shaft rotates at a constant speed.

It is well known that rotating shafts in certain applications are subjected to uneven distribution and intermittent shock loads of various frequencies which cause the shaft to twist with a resultant action whereby the diameter IJ will be ahead of time in its rotation as shown in Fig. 2 and in some other cases the diameter IJ may be behind time in its rotation as shown in Fig. 3.

The pendulum bobs, P-1, P-2 due to their inertia will tend to rotate evenly. Otherwise stated, the bobs P-1 and P-2 will remain on the line XX'. When looking at the shaft with a stroboscope, P-1 and P-2 will not indicate any movement from their proper respective positions while I and J oscillate on each side of the line XX' due to the vibrations emanating at the shaft S. As shown in the illustration in Figs. 1, 2 and 3 the resultant of all forces acting on a pendulum have at all times the direction IP-1 and JP-2, and the amplitude thereof is the value of the centrifugal force acting on the pendulum. This is shown by the arrows indicated at each instance by the letter F. It can be seen that the force indicated by the arrows F creates a torque which tends to pull back the disobedient diameter IJ to the position it occupied as shown in Fig. 1 wherein the relative positions of the pendulums P-1 and P-2 with respect to the pulley C is shown as being the position of no twist or no vibration present in the shaft S, and that therefore the reduction of the vibration is complete. Otherwise stated, the pendulums create a torque which exactly balances the torque causing the vibrational twist of the shaft.

Of course, it is understood, that the weight of the pendulums should be computed to create a predetermined force F to balance the exciting forces emanating from the shaft S and the pendulum length $r$ should be so adjusted that the pendulum will beat on time with the exciting vibration.

Conventional dampers attempt to reduce the amplitude of a vibration by destroying part of its energy resulting in a limited destruction of vibrations and to obtain an efficiency of 100 per cent would require an infinite mass for the damper.

Bifilar centrifugal pendulum dampers are not actually true dampers as the term is currently employed in engineering. The fundamental principles of operation of bifilar centrifugal pendulum dampers impart a new action in that when the main system, constituting the shaft S and pulley C, is ahead of time, the pendulum stores the extra energy and restores it when the main system is behind time. This is not a destruction of objectionable vibrations but an exchange of energy and the efficiency can be total with a predetermined mass with the consequences that pendulums of the character herein described give the highest efficiency possible with the lowest weight requirements.

It is the fundamental concept of a bifilar pendulum damper to be tuned to an order and not to a frequency. As has been hereinbefore shown the pendulums meet an exciting torque with an equal counter-torque while a conventional damper seeks to deal with the twist of the shaft and attempt to hold it quiet. Pendulums deal with the cause of the twist in the shaft and endeavor to suppress it. In this connection it should be understood that the tuning of a conventional damper depends upon the frequency of the shaft and that each time a change is made in this frequency by employing different connecting rods, longer or shorter shafts, different flywheels, etc., the conventional damper requires a retuning for each change made. Bifilar centrifugal pendulum vibration dampers do not require changes in the characteristics of the pendulums.

It is well known that torsional periods exciting the shaft in a motor are created by the firing of the cylinders. For example, a six cylinder four cycle engine in one revolution fires three times, creating three pulses and harmonics of that number called the order of the vibration. Regardless of the condition of the road being traveled, the shaft, the drive and other well known factors, the vibration conditions will remain the same and a different pendulum will deal with each troublesome order. Otherwise stated, that a pendulum vibration damper design, for example, to balance the 6, 4½ and 3rd orders in a particular six cylinder engine will satisfactorily and effectively operate in any six cylinder engine of approximately the same size.

In automobiles the engines have several critical speeds in the running range, none of which are dangerous enough to result in an early breakage of the crankshaft; however, vibration damping devices have been found absolutely necessary in order to eliminate objectionable noise and to obtain smoother running conditions, and ancillary thereto, to increase effectively the life of the engine since the provision of a damper has been found to provide reduction of torsional vibrations which result in a reduction of the bending vibrations thereby effective to increase the life of the bearings, timing chains, etc. The trend in engines toward higher speeds and higher compression ratios makes the vibration problem more serious because of the sharp increase in peak torque load requirements heretofore only found in unusual circumstances, these conditions resulting in objectionable vibration tendencies in the crankshafts which must be overcome to provide an effective life to the component parts of the engine and to obtain smooth engine operation.

Having thus generally described the geometric principles of bifilar centrifugal pendulum vibration dampers and some of their very specific advantages, the detailed description of a bifilar centrifugal pendulum vibration damper contemplated by this invention and adapted to provide the aforesaid desirable features, will now be described in detail.

In the exemplary embodiment of the invention depicted in Figs. 4, 5, 6 and 7, the bifilar centrifugal pendulum damper with which the present invention is particularly concerned is indicated in its entirety by the numeral 20 and comprises, in general, a body 21 which may be fixedly secured to the pulley C by any convenient means, for example, bolts 22 and 23 so that the body member will rotate with the pulley, a pendular mass 25 formed of metal to define the shape as shown, said body member 21 and said pendular mass 25 being provided on their peripheral surfaces respectively with sprocket teeth formations 26 and 27, and means for suspending the pendular mass 25 from the body member 21 comprising articulated chain links preferably of the silent chain type indicated in their entirety by the numeral 30 and being in wrapped arrangement about the body member 21 and the pendular mass 25 with the teeth of the articulated chain links 30 cooperating with the sprocket teeth formations 26 and 27 respectively disposed on the peripheries of the body member 21 and the pendular mass 25.

The body member 21 may be formed of metal to define the shape as shown and is provided with an arcuate periphery upon which teeth formations 26 may be formed. A tongue 31 formed integrally with the body member 21 projects outwardly therefrom and is adapted to be received into a suitable groove 32 disposed in the pendular mass 25 so that, in assembly, axial displacement with respect to the body member 21 and the pendular mass 25 is prevented. In this connection it is notable that it is desirable to have the pendulum mass swing only in a plane parallel to the plane defined by the pulley C in its rotating movement.

The pendular mass 25 is formed of metal defining a generally arcuate shape with the periphery thereof provided with the sprocket teeth formations 27. The balance of the pendular mass 25 is shaped to conform with the general contour of the body member 21. It is notable that in adapting the instant bifilar centrifugal pendular damper to any specific application, a pendular mass as at 25 of a predetermined weight may be selected in an effort to provide the force F necessary to accomplish the desired results as hereinbefore described with respect to the diagrammatical illustrations disclosed in Figs. 1, 2 and 3.

In order to fixedly secure the articulated chain links 30 in their operative position in wrapped relationship upon the body member 21 and the pendular mass 25, and in order to permit pendular motion of the pendular mass 25 with respect to the body member 21 there is provided a clamp 40 fixedly secured to the body member 21 and in embracing relationship with respect to portions of the articulated chain links 30, and a clamp 41 fixedly secured to the pendular mass 25 and in embracing relationship with respect to adjacent portions of the articulated chain links 30.

Thus, it can be seen that the pendular mass may impart a pendular motion with respect to the body member 21 because of the co-action of the articulated chain links 30 and the sprocket teeth formations 26 and 27 respectively disposed on the peripheries of the body member 21 and the pendular mass which provide the means of suspension of the pendular mass with respect to the body member 21 for pendular movement of the pendular mass 25 in a plane parallel to a plane defined by the pulley C in its rotative movement and with relative axial movement of the pendular mass 25 with respect to the body member 21 being definitely limited by virtue of the co-action between the tongue 31 and the groove 32 into which the tongue 31 is freely disposed when the device is assembled.

In adapting a bifilar centrifugal pendulum vibration damper to a particular application consideration should be given as to the length of the chain in order to provide a proper predetermined length of suspension and with consideration also being given to the weight of the pendular mass 25 in order to provide the required force F defined in the examples diagrammatically illustrated in Figs. 1, 2 and 3.

The instant bifilar centrifugal pendulum vibration damper being formed of simple parts and readily available materials, lends itself to mass production manufacturing principles, thus affording a substantial saving in the manufacturing costs.

From the foregoing disclosure it may be observed that I have provided an improved bifilar centrifugal pendulum vibration damper which efficiently fulfills the objects hereof as hereinbefore stated and which provides numerous advantages which may be summarized as follows:

1. Structurally simple, efficient and durable;

2. Economical to manufacture and readily adapted to mass production manufacturing principles; and 3. The provision of a bifilar centrifugal pendulum vibration damper in which there is provided a novel suspension of the pendulum mass with respect to a rotatable body member by the employment of articulated chain links preferably of the silent chain type.

While I have illustrated embodiments of my invention, many modifications may be made without departing from the spirit of the invention, and I do not wish to be limited to the precise details of construction set forth, but wish to avail myself of all changes within the scope of the appended claims.

I claim:

1. A bifilar centrifugal pendulum vibration damping device which comprises, a body member adapted to be fixedly secured to a rotating means, a pendular mass, the peripheries of said body member and said pendular mass being provided with sprocket teeth, means integrally formed with said body member and comprising a torque member arranged to cooperate with groove portions of said pendular mass to limit relative axial movement between the body member and the pendular mass but to permit pendular motion of the pendular mass with respect to the body member in a plane parallel to the plane defined by the rotation of the body member, and means comprising articulated chain links disposed in wrapped relationship with respect to the body member and the pendular mass and with the teeth thereof cooperating with the sprocket teeth disposed on the peripheries of said body member and said pendular mass to permit pendular movement of the pendular mass with respect to the body member.

2. In combination with rotating means, a bifilar centrifugal pendulum vibration damping device including a pendulum which comprises, in combination, a body member fixedly secured to said rotating means, a pendular mass, the peripheries of said body member and said pendular mass being provided with sprocket teeth, means integrally formed with said body member and comprising a tongue member of lesser thickness than said body member arranged to cooperate with bifurcated portions of said pendulum mass to limit relative axial movement between the body member and the pendular mass but to permit pendular motion of the pendular mass with respect to the body member in a plane parallel to the plane defined by the rotation of the body member, and means comprising articulated chain links disposed in wrapped relationship with respect to the body member and the pendular mass and with the teeth thereof cooperating with the sprocket teeth disposed on the peripheries of said body member and said pendular mass to permit pendular movement of the pendular mass with respect to the body member.

3. In a bifilar centrifugal pendulum vibration damper having a body member, a pendular mass, and means for suspending the pendular mass from the body member for relative pendular movement therebetween, the improvement in the means for suspending and limiting movement of the pendular mass comprising sprocket teeth formations on the peripheral surfaces of the body member and pendular mass and articulated chain links disposed in said sprocket teeth and in wrapped arrangement about the body member and pendular mass in a manner to allow winding of the chain on one while simultaneously unwinding from the other, the articulation of the chain, winding and unwinding thereof cooperating to effectively increase the ability of the damper to reduce vibration, and a pair of tongue means of lesser thickness than the thickness of said body member disposed radially inwardly of the sprocket teeth formations on the body member, a pair of grooves in said pendular mass, said tongues being disposed in said grooves and arranged to cooperate with one another to limit the movement between the body member and the pendular mass but to permit the aforementioned winding and unwinding of the chain.

EARL F. RIOPELLE.

References Cited in the file of this patent

UNITED STATES PATENTS

| Number | Name | Date |
|---|---|---|
| 2,393,305 | Birkigt | Jan. 22, 1946 |

FOREIGN PATENTS

| Number | Country | Date |
|---|---|---|
| 8,869 | Netherlands | Jan. 16, 1923 |